(12) United States Patent
McManus et al.

(10) Patent No.: US 11,599,617 B2
(45) Date of Patent: Mar. 7, 2023

(54) MOBILE SCREENING VEHICLE AND METHOD FOR MOBILE SECURITY SCANNING

(71) Applicant: The Government of the United States of America, as represented by the Secretary of Homeland Security, Washington, DC (US)

(72) Inventors: Kali McManus, Woodbridge, VA (US); Kristi Harmel, Colorado Springs, CO (US); Gregory Bennett, Colorado Springs, CO (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 17/731,560

(22) Filed: Apr. 28, 2022

(65) Prior Publication Data
US 2022/0350872 A1  Nov. 3, 2022

Related U.S. Application Data

(60) Provisional application No. 63/181,517, filed on Apr. 29, 2021.

(51) Int. Cl.
*G06F 21/32* (2013.01)
*G06F 21/44* (2013.01)
(Continued)

(52) U.S. Cl.
CPC ............. *G06F 21/32* (2013.01); *B60W 40/08* (2013.01); *B60W 60/00253* (2020.02);
(Continued)

(58) Field of Classification Search
CPC ........ G06F 21/32; G06F 21/44; B60W 40/08; B60W 60/00253; B60W 2540/043;
(Continued)

(56) References Cited

U.S. PATENT DOCUMENTS

| 10,507,787 B2 * | 12/2019 | Ferguson | ............ A47J 37/0658 |
| 2008/0164974 A1 * | 7/2008 | Cochran | ................ G07C 9/257 |
| | | | 340/5.82 |

(Continued)

FOREIGN PATENT DOCUMENTS

WO  WO-2020182448 A1 *  9/2020  ............. G06Q 50/26

OTHER PUBLICATIONS

Tia Vialva,"Local Motors Introduce OLLLI 2.0, an Improved, Autonomous 3D Printed Shuttle", 3D Printing Industry, Sep. 4, 2019, https://3dprintingindustry.com/news/local-motors-introduce-olli-2-0-an-improved-autonomous-3d-printed-shuttle-161145/.

*Primary Examiner* — Dale W Hilgendorf
(74) *Attorney, Agent, or Firm* — Lavanya Ratnam; Robert W. Busby; William Washington

(57) ABSTRACT

Examples are directed toward a system and method relating to mobile screening. For example, a mobile screening vehicle includes a passenger scanner that performs security scanning of a passenger on the mobile screening vehicle. The mobile screening vehicle also includes a verification system that verifies, consistent with the security scanning of passengers, that passengers on the mobile screening vehicle are approved to proceed to a secure area of a travel venue.

26 Claims, 8 Drawing Sheets

(51) Int. Cl.
*G01C 21/34* (2006.01)
*G01C 21/36* (2006.01)
*G06Q 50/30* (2012.01)
*G06V 40/40* (2022.01)
*B60W 40/08* (2012.01)
*B60W 60/00* (2020.01)
*G06Q 10/06* (2012.01)
*G06Q 50/26* (2012.01)
*G06Q 10/0631* (2023.01)

(52) U.S. Cl.
CPC ..... *G01C 21/3484* (2013.01); *G01C 21/3617* (2013.01); *G06F 21/44* (2013.01); *G06Q 10/06315* (2013.01); *G06Q 50/30* (2013.01); *G06V 40/40* (2022.01); *B60W 2540/043* (2020.02); *G01C 21/3438* (2013.01); *G06Q 50/26* (2013.01)

(58) Field of Classification Search
CPC ............ G01C 21/3484; G01C 21/3617; G01C 21/3438; G06Q 10/06315; G06Q 50/30; G06Q 50/26; G06V 40/40
See application file for complete search history.

(56) References Cited

U.S. PATENT DOCUMENTS

| | | | |
|---|---|---|---|
| 2012/0148020 A1* | 6/2012 | Arroyo, Jr. | G01V 5/0016 378/57 |
| 2014/0341344 A1* | 11/2014 | Arroyo, Jr. | G01V 3/165 378/57 |
| 2015/0033305 A1* | 1/2015 | Shear | G06F 21/32 726/11 |
| 2018/0052462 A1* | 2/2018 | Arena | H04W 4/029 |
| 2019/0265703 A1* | 8/2019 | Hicok | G05B 13/027 |
| 2021/0252715 A1* | 8/2021 | Javidan | G06Q 10/0833 |
| 2021/0256466 A1* | 8/2021 | Javidan | G06Q 10/08355 |
| 2021/0256472 A1* | 8/2021 | Javidan | G06Q 10/0832 |

* cited by examiner

MOBILE SCREENING VEHICLE AND METHOD FOR MOBILE SECURITY SCANNING

CROSS-REFERENCE TO RELATED APPLICATIONS

This application claims the benefit of U.S. Provisional Application No. 63/181,517 entitled "Ride and Scan," filed on Apr. 29, 2021, incorporated herein by reference in its entirety.

STATEMENT OF GOVERNMENT INTEREST

The claimed subject matter made by one or more employees of the United States Department of Homeland Security in the performance of official duties. The Government has certain rights in the invention.

FIELD

The discussion below relates generally to security, and more specifically to security screening in transportation.

BACKGROUND

This section provides a brief introduction to the technical subject matter without distinguishing what aspects of the technology are or are not in the prior art. Nothing in this section amounts to an admission regarding the prior art.

Travel venues can involve long lines and crowding, lengthy wait times, and generally chaotic environments. Such environments can pose difficulties for passengers who visit the travel venue, e.g., as part of traveling and undergoing a security screening process. For some passengers, the difficult environments can be overwhelming. For example, people with Autism may avoid flying due the likelihood of overstimulation from lights, sounds, or crowds. The physical aspects of security screening are also challenging, due to how autistic people can have sensitivities to physical touch and difficulties when separated from their comfort items (IPAD, headphones, etc.), often as a result of security screening processes.

SUMMARY

In an embodiment, a mobile screening vehicle includes a passenger scanner that performs security scanning of a passenger on the mobile screening vehicle. The mobile screening vehicle also includes a verification system that verifies, consistent with the security scanning of passengers, that passengers on the mobile screening vehicle are approved to proceed to a secure area of a travel venue.

In another embodiment, a method for mobile security scanning by a mobile screening vehicle includes a passenger scanner of the mobile screening vehicle performing security scanning of a passenger on the mobile screening vehicle. The method also includes a verification system of the mobile screening vehicle verifying that passengers on the mobile screening vehicle are approved, consistent with the security scanning of passengers, to proceed to a secure area of a travel venue. The mobile screening vehicle transports the passenger to a drop off location in the secure area of the travel venue.

Other features and aspects of various embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

BRIEF DESCRIPTION OF THE DRAWINGS

One or more embodiments of the subject matter are described in detail with reference to the following drawings. These drawings are provided to facilitate understanding of the present subject matter and should not be read as limiting the breadth, scope, or applicability thereof. For purposes of clarity and ease of illustration, these drawings are not necessarily made to scale.

Figure 1:
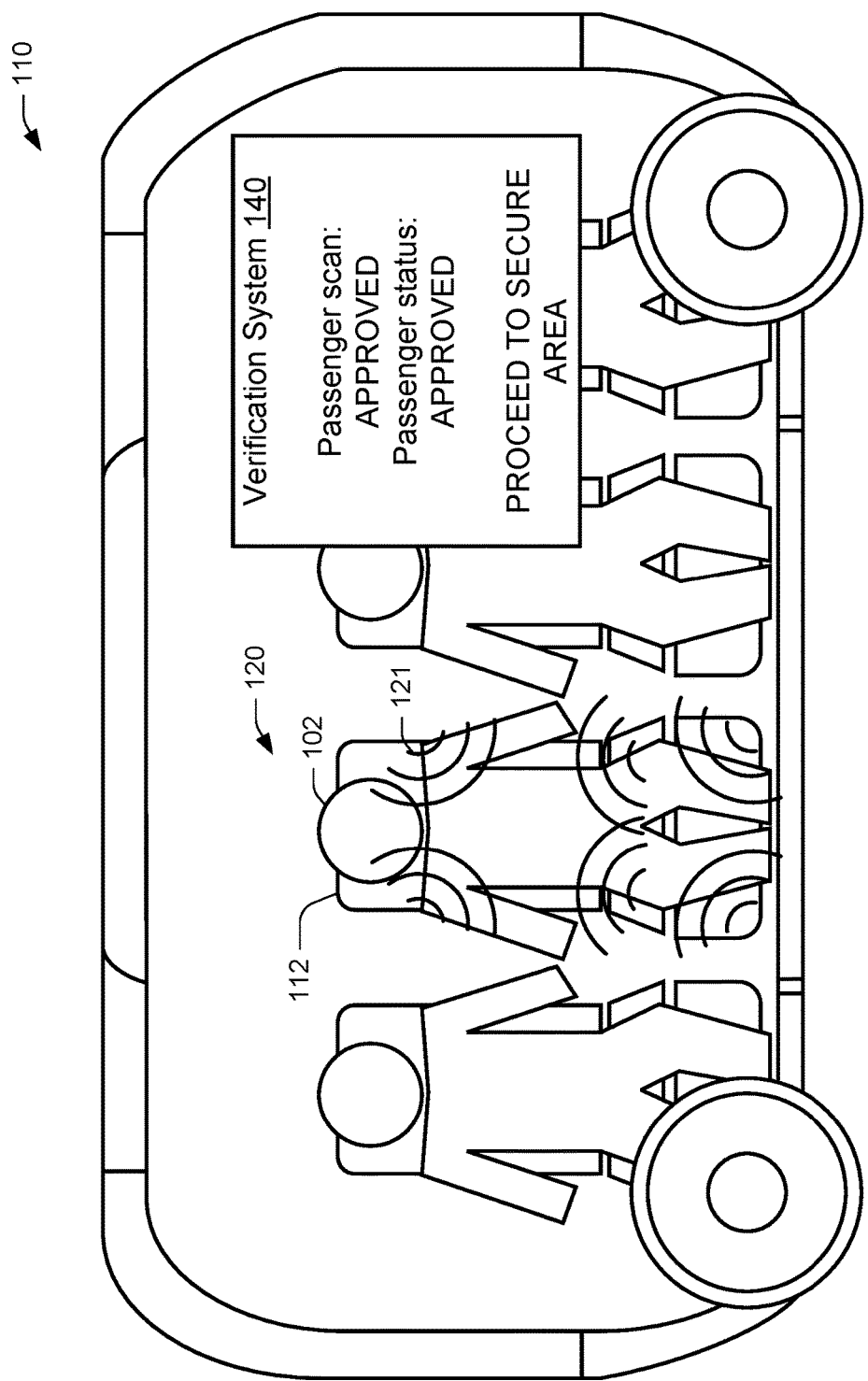
FIG. 1 illustrates a mobile screening vehicle including a passenger scanner according to an embodiment.

These drawings are not intended to be exhaustive or to limit the subject matter to the precise form(s) disclosed. It should be understood that the present subject matter can be practiced with modification and alteration, and that the subject matter is limited only by the claims and the equivalents thereof.

DETAILED DESCRIPTION

Embodiments and methods described herein of the mobile screening vehicle also may be referred to as Ride and Scan or Ride & Scan. Embodiments provide an integrated system to scan passengers or baggage en route from unsecure locations to secure locations at a travel venue. Ride and scan can use a manual vehicle with driver, or an autonomous vehicle that can navigate the layout and routes inside and outside a travel venue that the mobile screening vehicle is servicing.

Embodiments of the mobile screening vehicle described herein can be used in various scenarios by different types of passengers. Passengers can include persons with disabilities, such as those with hearing impairment or vision impairment, those who are wheelchair bound, those suffering from post-traumatic stress disorder (PTSD), those on the Autism spectrum, and the like. Embodiments of the mobile screening vehicle can be used to transport airport personnel arriving for their shift. The mobile screening vehicle can be used to transport very important persons (VIPs), streamlining the process to get the VIPs onto their airplanes. The mobile screening vehicle can potentially be used to transport any passenger, based on the number of available mobile screening vehicles and expected or scheduled passenger loads.

Ride & scan enables persons with disabilities to undergo a type of security screening that bypasses traditional airport security. The mobile screening vehicle enables passengers to ride in an autonomous vehicle that scans the passengers or their baggage while riding. The mobile screening vehicle also can scan airport workers while transporting the workers from parking lots or bus stops to worker entrances where airport workers enter the airport (or other travel venues). Embodiments can scan passengers non-intrusively, without the passengers realizing they are being scanned. Ride and Scan creates a safe and customizable environment for those who may need it. The features described herein can be implemented on different types of vehicles, including autonomous vehicles.

Ride and Scan can make use of such autonomous vehicles, by incorporating screening technologies and customizing the vehicle's system (front end systems and back end systems) to address general audiences as well as targeted audiences such as people with Autism. Ride and Scan autonomous mobile screening vehicles thereby provide general and targeted benefits to the traveling public.

Ride and Scan provides airlines with a way to differentiate themselves from other airlines, providing a better customer experience at the airport including a way to get their customers from check in to the gate without having to undergo a Transportation Security Administration (TSA) security screening process. Ride and Scan enhances Transportation Security Officer (TSO) safety by enabling the TSOs to remotely review scanning information collected by the mobile screening vehicle on the go. Ride and Scan enables continued efficiency with TSA screening, and can incorporate automatic cleaning or disinfecting options, such as onboard ultraviolet (UV) lights.

FIG. 1 illustrates a mobile screening vehicle 110 including a passenger scanner 120 according to an embodiment. The mobile screening vehicle 110 includes a plurality of seats 112 to accommodate passengers 102. A seat 112 is associated with a seat scanner 121. The mobile screening vehicle 110 also includes a verification system 140. The seat scanner 121 and verification system 140 enable the mobile screening vehicle 110 to accomplish TSA security checkpoint scanning.

Figure 4:
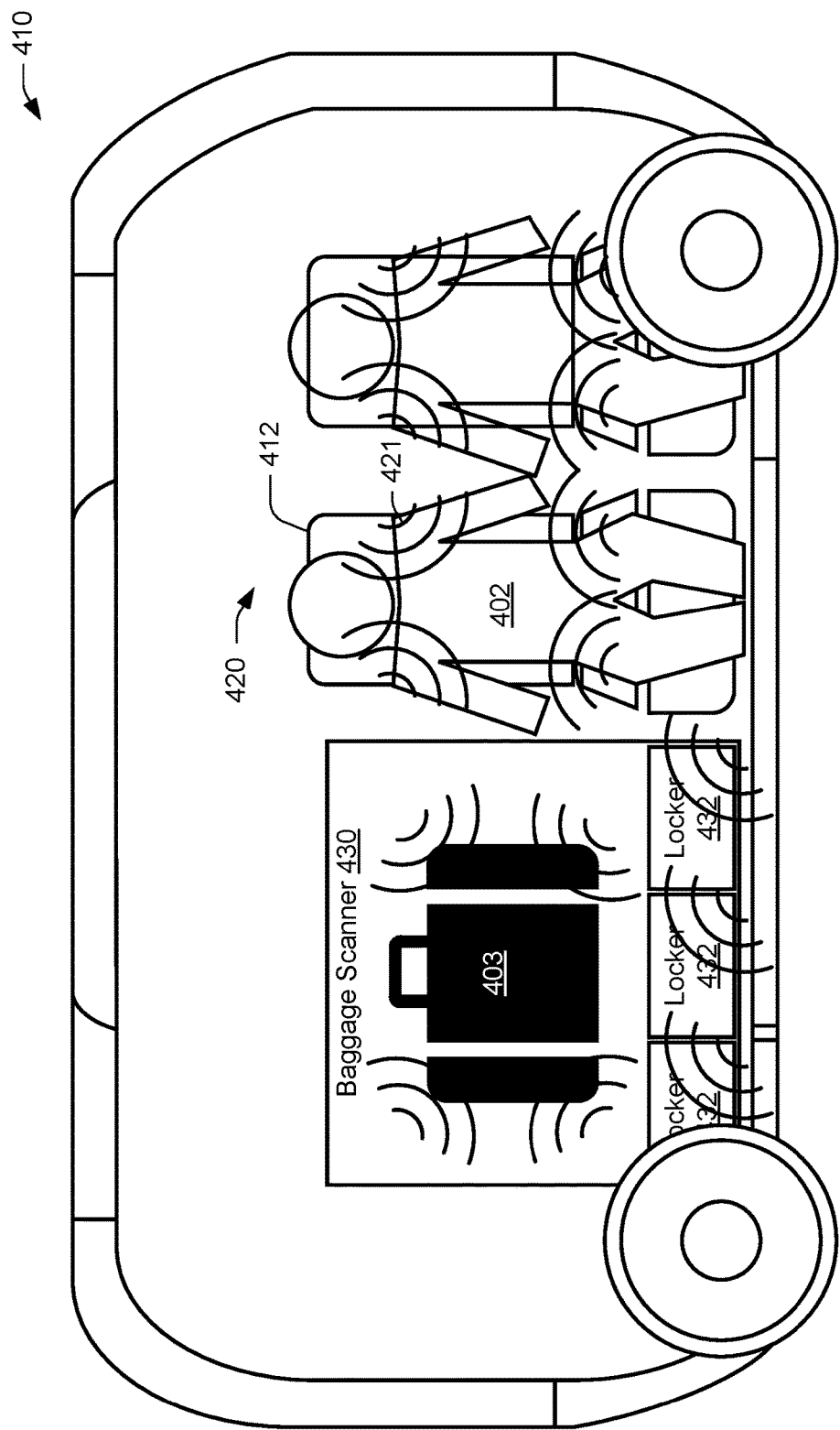
FIG. 4 illustrates a mobile screening vehicle including a passenger scanner and a baggage scanner according to an embodiment.

The mobile screening vehicle 110 is illustrated as an autonomous vehicle, without a human driver. In an embodiment, the mobile screening vehicle 110 includes a human driver. The mobile screening vehicle 110 transports passengers 102, including persons with disabilities and airport workers, while scanning the passengers 102. In an embodiment, the mobile screening vehicle 110 transports and scans the baggage of the passengers 102, e.g., using a baggage scanner 430 as shown in FIG. 4, which can be incorporated into the various different illustrated embodiments. The mobile screening vehicle 110 enables mobile screening in a customizable environment while outside or inside a travel venue such as the airport and surrounding neighborhood or parking lots.

The mobile screening vehicle 110 integrates scanning technologies within the vehicle to accomplish scanning that, e.g., meets or exceeds the requirements of TSA checkpoint security scanning. Embodiments of the mobile screening vehicle 110 can include cameras inside and out, and have significant interior room for passengers 102 and baggage. The mobile screening vehicle 110 can include a user interface such as a large touch-screen display for passengers 102 to use, and other customizable and reconfigurable features as described herein. For example, such customization provides an embodiment including a sanitizing system to keep passengers safe, a deployable ramp for passengers with mobility challenges, voice control, app integration, vehicle location sensors, climate control, artificial intelligence to read sign language, and the like. The mobile screening vehicle 110 transports passengers 102 including those with disabilities, e.g., from airport check-in locations to the appropriate airline gates, while scanning passengers and baggage in transit to the gates. In another embodiment, the mobile screening vehicle 110 boards passengers 102 and does not disembark until completing scans of the passengers and their baggage. In yet another embodiment, the mobile screening vehicle 110 includes exterior passenger scanners or scanners included as a portal or entryway into the mobile screening vehicle 110, which scans passengers prior to allowing the passengers to board the mobile screening vehicle 110. Embodiments of the mobile screening vehicle 110 include TSA approved screening devices, safe for humans. The mobile screening vehicle 110 can transport airline staff and airport workers from designated parking areas to the terminal, scanning them in transit to ensure safety.

Embodiments of the mobile screening vehicle 110 implement various technologies, such as autonomous vehicle navigation, baggage scanning, and person scanning. The mobile screening vehicle 110 can include image-based displays and user interfaces, such as an image-based dashboard. Embodiments can implement voice control and sign language recognition and interpretation. Embodiments can interact with passengers 102 via integration with a smartphone app. For example, a passenger 102 can use their smartphone to check availability of the mobile screening vehicle 110, schedule a pickup, specify information such as flight information, provide identity verification, request stops en route, and the like. Embodiments can include interior cameras or exterior cameras, e.g., for security tracking. Embodiments can use sensors for navigation and location tracking, e.g., to detect vehicle proximity to transition borders between secure areas and unsecure areas (e.g., the transition serving as a point of no return after scanning is complete or after vehicle contents are approved). Embodiments also can include an adjustable interior climate, to adjust and control lighting conditions, noise conditions, temperature conditions, and other conditions to which passengers 102 are exposed.

Such features enable embodiments of the mobile screening vehicle 110 to cater to the needs of individuals with Autism Spectrum Disorder (ASD). People with Autism may avoid flying or other travel and the associated travel venues. People with Autism can have sensitivity to touch, such as from a pat down secondary screening, which can be a part of a security screening process. People with Autism can suffer anxiety and emotional breakdowns from triggers or stimuli such as bright lights, loud sounds, and crowds, conditions which can be found at a travel venue. Embodiments of the mobile screening vehicle 110 enable passengers 102 to avoid such conditions and thereby reduce stressors, avoid the need for a pat down at security checkpoints, create a customizable environment, and provide transportation and security screening services to millions of people who avoid or suffer from travel venues such as airports during aviation travel.

Embodiments of the mobile screening vehicle 110 enable mobile screening, in a customizable environment, whether outside or inside a travel venue such as an airport. Embodiments therefore meet the underserved needs of a large community of potential passengers. In an embodiment, the mobile screening vehicle 110 is safe, small, electric, autonomous, and can operate in congested indoor environments. In an example, the mobile screening vehicle 110 is an autonomous, electric-powered bus called OLLI, manufactured by a U.S.-based company called LOCAL MOTORS. The mobile screening vehicle 110 can include sensors for autonomous driving, and is customizable and reconfigurable.

In an embodiment, the mobile screening vehicle 110 includes the following capabilities and specifications. Range: 40 mi/60 km (nominal), 25 mi/40 km (max load, max A/C), average range up to 30 mi.; Max Speed: 40 km/h (25 mph) (limited); Max Torque: 2,500 Nm, continuous torque 1300 Nm; Max Power: 160 kW (215 hp), continuous power 120 kW; Motor type: PROTEAN Pd18 Hub motor ×2; Power system Max Capacity 18.5 kWh (16.2 usable); Charger type 11 kWh; Charge Time (440 V): 1.5 hours (level 2; varying on EVSE); Transmission: 9.59.1 gear ratio; Curb Weight: 2654 kg (5850 lbs.); Carrying Capacity 907 kg (2000 lbs.), 10 seated passengers; Length: 3945 mm (12.94 ft); Width: 2050 mm (6.73 ft); Height: 2637 mm (8.65 ft); Passenger Room Height 1921 mm (6.3 ft); Wheelbase: 2570 mm (8.43 ft); Sensors: LiDAR 7× 3D VELODYNE; Radar 4× SRR2, 1× Fwd ESR; Inertial Measurement Unit; Optical Camera 10× HD CCTV; 2× GPS Antenna; Communications: Wi-Fi; 4G LTE GSM; 5G; On-Board Data Recorder; HVAC: In-Roof Unit, 8.5 kW Cooling, 10 kW Heating.

The security scanners, including passenger scanner 120 and baggage scanners, are TSA-approved screening devices, safe for humans. Scanning equipment can be based on advanced imaging technology (AIT), X-Ray technology including pass-through, transmissive, or backscatter X-Ray scanners, millimeter wave (mmW) imaging, terahertz imaging, thermal imaging systems, Computed Tomography (CT) imaging, nuclear quadrupole resonance (NQR) imaging, dielectrometry systems, metal detection systems, explosive trace or odor detection via airflow sampling, future screening technologies, and the like. Scanning equipment can rely on proximity, e.g., when seated in a seat scanner or standing next to a wall scanner. Scanning equipment also can operate remotely, such as using ceiling mounted imaging technology to scan a swath of the mobile screening vehicle 110. Scanning equipment can include modules or chambers interchangeably mounted to the mobile screening vehicle 110, such as a liquid explosives detection screening module, air puffer explosive analysis chamber, shoe scanner, and the like. Scanning equipment can be integrated to allow passengers to be seated while scanning executes, such as in the illustrated seat scanner 121 integrated into seat 112. The mobile screening vehicle 110 can integrate current and future mobile scanning equipment as part of the passenger scanner 120 or baggage scanner. Scanning equipment can be hidden from passengers.

In an embodiment, the scanning equipment involves passenger 102 interaction, and can involve prompts from a user interface or smartphone app to direct a passenger 102 how to interact with the scanning equipment (e.g., "please be seated to activate the seat scanner," "A drink container is detected from visual recognition. Please place drink container into the liquid screening module," and so on). The mobile screening vehicle 110 also can use 3D laser measurement or scanning systems, high-resolution camera systems, ramen laser analyzation systems, or other optical systems. Embodiments can implement real-time video analytics to scan, analyze, and recognize activity or contents of the mobile screening vehicle 110. The mobile screening vehicle 110 can include processors, controllers, and software such as artificial intelligence to analyze scanning information or other information collected by sensors. The mobile screening vehicle 110 can determine whether captured video of the passengers 102 indicates whether the passengers 102 have complied with guidance or direction. In an embodiment, the mobile screening vehicle 110 does not proceed until confirming that a passenger 102 has complied with guidance and direction that the mobile screening vehicle 110 issued to the passengers 102.

In an embodiment, scanning equipment, such as passenger scanner 120 or a baggage scanner, does not interfere with passenger comfort. Various types of equipment (x-ray, millimeter wave, optical) provide the mobile scanning and screening of passengers and baggage. The scanning and screening equipment can be contained or positioned in the vehicle in various ways suitable for handling the passengers 102 or baggage. Equipment can subject the passenger 102 to screening and scanning without the passenger 102 being inconvenienced. For example, a portable version of the equipment can be installed inside the vehicle's seats, so that the person sits down to be automatically scanned. The mobile screening vehicle 110 can detect that a passenger is seated based on seat sensors, camera systems using visual recognition, thermal sensors, and the like. Various approaches can be used for baggage scanning, including automated systems that intake and convey the baggage past a baggage scanner to a baggage holding area of the vehicle.

In an embodiment, a user (passenger, crew, airport employee, etc.) summons the mobile screening vehicle 110 to a pickup location using a mobile phone application (app). The mobile screening vehicle 110 allows the passenger to designate which of multiple pickup location the passenger would prefer. In an embodiment, the passenger uses the mobile phone app to provide GPS coordinates of the passenger's position. The mobile screening vehicle 110 pulls up to the designated pickup location, which can be anywhere outside or inside the travel venue. The passenger loads the baggage onto the mobile screening vehicle 110, and the passenger 102 boards the mobile screening vehicle 110. In an embodiment, the mobile screening vehicle 110 includes a baggage intake portal to automatically receive baggage and convey the baggage into a safe storage location such as a locker of a baggage scanner.

In an embodiment, the mobile screening vehicle 110 uses the verification system 140 to verify that the passenger 102 boarding the mobile screening vehicle 110 matches the identity of the passenger 102 who is scheduled to board the vehicle, or matches the passenger 102 depicted on passenger identity documentation. For example, the mobile screening vehicle 110 uses cameras, fingerprint scanners, palm scanners, retina scanners, voice scanners, facial scanners, or other biometric verification equipment to scan documents and credentials presented for passenger verification, or to scan the passenger. Thus, the mobile screening vehicle 110 is capable of verifying human identity by performing a real-time liveness check of the passenger 102 upon boarding. The mobile screening vehicle 110 can retrieve information from a parent or guardian who presents identity information on behalf of a minor or other passenger 102 who is boarding the mobile screening vehicle 110.

The mobile screening vehicle 110 obtains the passenger's flight number, whether directly or indirectly. For example, the mobile screening vehicle 110 can obtain the flight number directly, via user input or designation, or by scanning the flight number from a travel document or ticket. In an embodiment, mobile screening vehicle 110 communicates with a travel venue back end or travel carrier reservation system or back end system to look up or retrieve flight information corresponding to the passenger's identity as determined by the verification system 140. Embodiments of the mobile screening vehicle 110 can use various techniques to determine the vehicle destination. For example, where multiple passengers request multiple different drop off locations or fail to specify any drop off location, the mobile screening vehicle 110 can use a round-robin style of visiting each travel carrier's section of the travel venue, announcing the name of the proximate travel carrier, and pausing or otherwise allowing passengers 102 to indicate whether they would like to disembark. If so, the mobile screening vehicle 110 stops at a drop off location for that travel carrier, and allows the passenger 102 to disembark. In an embodiment, the mobile screening vehicle 110 looks up flight information for passengers 102 by obtaining the passenger's identity via a mobile phone app, or by obtaining passenger identity via verification system 140 obtaining identification documentation that the verification system 140 scans when presented by passengers upon boarding.

In an embodiment, the mobile screening vehicle 110 informs the passengers 102 of the proposed destination and route, and asks if the passenger 102 would like to make any stops. The passenger 102 sits in the mobile screening vehicle 110. The mobile screening vehicle 110 scans the passenger's baggage (e.g., using baggage scanner 430 of FIG. 4), and scans the passenger 102 (e.g., using a seat scanner 121 that operates while the passenger 102 is seated in seat 112). The mobile screening vehicle 110 scans the passenger 102 using one or more of various TSA-compatible scanning technologies as mentioned herein. The mobile screening vehicle 110 uses the verification system 140 to processes and validate the passenger's identity. The mobile screening vehicle 110 similarly uses the verification system 140 to scan and process the bag tag information of a bag (e.g., as displayed by the tag in a barcode or quick response (QR) code or similar 2D barcode or matrix. Based on the scanning results and the identity validation, the mobile screening vehicle 110 determines whether the passenger 102 or baggage is safe to proceed to a secure area of the travel venue.

The mobile screening vehicle 110 can perform identity validation, scanning, screening, and other security-related operations while driving, before arriving at a secure area. The mobile screening vehicle 110 can communicate with back end servers to facilitate security-related operations. In an embodiment, the mobile screening vehicle 110 collects information from the passenger 102 or baggage (e.g., by scanning a boarding pass or baggage ticket), and passes the information to a back end system for performing the security-related operations. The vehicle navigates through the travel venue and crosses a border between the unsecure area and the secure area, without needing to stop at a security checkpoint and without needing to separate passengers 102 from their comfort items (IPAD, headphones, etc.). The mobile screening vehicle 110 can proceed to a flight area, boarding gate, or other section of the travel venue. The mobile screening vehicle 110 drops off the passenger(s) 102 and baggage, and returns to the unsecure area of the travel venue. In embodiments, the mobile screening vehicle 110 uses cameras and other sensors to ensure that the passenger areas and baggage areas of the mobile screening vehicle 110 are empty before returning. When passengers 102 disembark, the mobile screening vehicle 110 may use sensors to detect baggage or other items (e.g., comfort items) left behind, and notify disembarking passengers 102 to prevent forgotten items. The mobile screening vehicle 110 may proceed outside of the travel venue, such as to parking areas or bus stops. The mobile screening vehicle 110 can return to a parking stall to automatically recharge itself.

Embodiments can address emergency situations, whether the mobile screening vehicle 110 is in an unsecure area or a secure area. The mobile screening vehicle 110 can encounter different emergency situations, and perform different emergency response actions depending on the emergency situation. For example, emergency situations can arise due to a condition of a passenger 102, a condition of the mobile screening vehicle 110, or both. Passengers 102 can notify the mobile screening vehicle 110 of an emergency situation, e.g., via verification system 140, a user interface, a mobile app, a physical push button or pull-handle etc., or the like.

An embodiment of the mobile screening vehicle 110 performs emergency response actions that align with the safety and operational procedures or guidelines of travel venues. For example, an airport can constrain the mobile screening vehicle 110 to a dedicated vehicle path, or constrain the mobile screening vehicle 110 to a maximum speed, and so on. Such example safety and operational procedures or guidelines can minimize the risk of exposure of other people at the travel venue to risk of collision. In an embodiment, the mobile screening vehicle 110 can perform emergency responses that do not violate such guidelines.

The mobile screening vehicle 110 can perform an emergency response action in response to a passenger 102 having an emergency, such as a health-related issue, when the mobile screening vehicle 110 remains in an operational state capable of performing the given emergency response. The mobile screening vehicle 110 includes various capabilities that can operate or fail independently, such as being able to open and close doors, steer, drive forward or backward, autonomously navigate, and so on. The mobile screening vehicle 110 may perform a given emergency response such as opening the doors to release a passenger 102 suffering from an emergency, even if the mobile screening vehicle's ability to navigate, steer, or drive have failed. The mobile screening vehicle 110 can diagnose which systems remain operational, and determine what emergency responses the mobile screening vehicle 110 is capable of performing at any given time.

In an embodiment, the mobile screening vehicle 110 can respond to a passenger emergency by determining that all systems are functional, and overriding an existing navigation path by navigating to a predetermined 'safe' location of the travel venue. Embodiments of a mobile screening vehicle 110 can include a 9-1-1 emergency button available for passengers 102 to inform the travel venue or airport (or the mobile screening vehicle 110) that a passenger 102 of the mobile screening vehicle 110 is in distress. When the dedicated 9-1-1 emergency button (or other options) is activated to signal an emergency, the mobile screening vehicle 110 redirects itself to the safe location. The mobile screening vehicle 110 can use one or more safe locations. For example, the travel venue can include an unsecure safe location for unsecure areas of the travel venue, and a secure safe location for secure areas of the travel venue. The mobile screening vehicle 110 can make use of the safe locations similar to situations where the mobile screening vehicle 110 obtains scanning results that are not approved and the mobile screening vehicle 110 redirects for human intervention in clearing the scanning issue.

In an embodiment, the mobile screening vehicle 110 includes artificial intelligence or other systems to automatically and visually recognize a distress situation, such as the recognition that a passenger 102 has assumed a prone position on the floor of the mobile screening vehicle 110. The mobile screening vehicle 110 can prompt for user input to confirm or deny an emergency situation, and respond accordingly. If there is no response to the confirmation prompt, the mobile screening vehicle 110 can default to an emergency response after a predetermined time period of no response. For example, the mobile screening vehicle 110 can automatically determine a prone position of a passenger 102, prompt for confirmation whether an emergency is happening. After 30 seconds the mobile screening vehicle 110 can re-prompt for confirmation. After one minute the mobile screening vehicle 110 can re-prompt for confirmation. If no response is received after two minutes, the mobile screening vehicle 110 can activate an emergency response by driving to a safe location and requesting assistance from TSOs manning the safe location.

The mobile screening vehicle 110 can also perform emergency responses for issues related to operational capabilities of the mobile screening vehicle 110. For example, the mobile screening vehicle 110 can diagnose itself and determine that one or more systems of the mobile screening vehicle 110 are in distress or have failed. If the mobile screening vehicle 110 is in motion, the mobile screening vehicle 110 safely performs an emergency stop. The mobile screening vehicle 110 operates the doors to allow passengers 102 to exit. The mobile screening vehicle 110 makes an announcement over one or more systems (audio, visual, tactile) to direct the passengers 102 to exit. In such emergency situations, the mobile screening vehicle 110 respects security protocol of the travel venue. For example, regardless of whether the mobile screening vehicle 110 is within an unsecure area or secure area, the mobile screening vehicle 110 will be carrying passengers 102 whose scan status corresponds to the secure or unsecure status of the area. If the passengers 102 have not yet been scanned (or their scan results are otherwise not approved), the mobile screening vehicle 110 will be in the unsecure area because it has not yet been approved to cross the point of no return from the unsecure area into the secure area. If the passengers 102 have been scanned and the scan results are approved, the passengers 102 are approved to be located in the secure area if the mobile screening vehicle 110 has made it into the secure area and the approved passengers 102 exit the mobile screening vehicle 110. If the mobile screening vehicle 110 has not yet transitioned into the secure area with the approved passengers 102, the approved passengers 102 are still free to exit the vehicle in the unsecure area without violating security screening protocols of the travel venue.

Various types of vehicles can be used in the embodiments described herein to accomplish the Ride and Scan concept. Embodiments can make use of buses, golf carts, sedans, airplanes, helicopters, flying cars, drones, or any vehicle capable of carrying passengers 102 and scanning technology for Ride and Scan.

Figure 2:
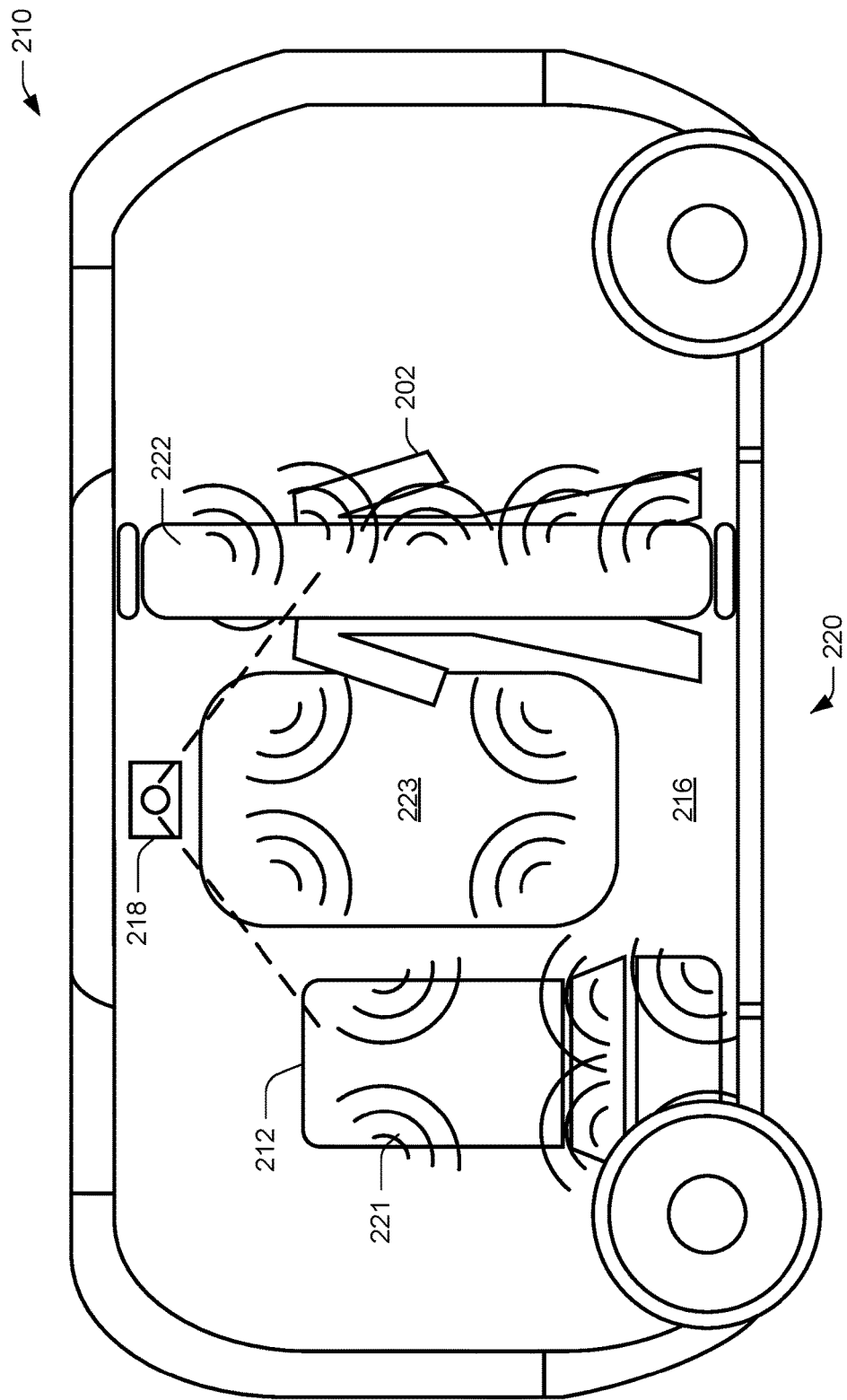
FIG. 2 illustrates a mobile screening vehicle including a plurality of passenger scanners according to an embodiment.

FIG. 2 illustrates a mobile screening vehicle 210 including a plurality of passenger scanners 220 according to an embodiment. Although multiple different passenger scanning technologies are illustrated, embodiments of the mobile screening vehicle 210 can use one or more technologies depending on particular configurations. The passenger scanners 220 include a seat scanner 221 integrated into a seat 212, a wall scanner 223 integrated into a wall 216, and an aisle scanner 222 incorporated into an aisle of the mobile screening vehicle 210. The mobile screening vehicle 210 also includes a camera 218 to monitor the passenger 202 and operation of the mobile screening vehicle 210. The location of camera 218 can also be used to include other remote sensing equipment or remote scanning equipment, such as those described herein, to scan a swath of the mobile screening vehicle 210. As illustrated, multiple scanning technologies or imaging technologies can be applied to the passenger, simultaneously or in series.

In the illustrated embodiment, the passenger 202 passes through a designated area (such as an entryway or chamber of the vehicle) corresponding to aisle scanner 222 when boarding the mobile screening vehicle 210. Accordingly, the mobile screening vehicle 210 scans the passenger 202 without the passenger 202 being inconvenienced, such as before the passenger 202 is seated. As illustrated, the passenger 202 is passing through aisle scanner 222, such as a metal detector, as part of boarding the mobile screening vehicle 210 when finding a seat 212.

The passenger 202 next passes by wall scanner 223 in view of camera 218 on the way to the seat 212. The wall scanner 223 (or camera 218, or other remote sensor) can serve as a redundancy by performing a scan of the passenger 202 that duplicates the detection capabilities of the aisle scanner 222 (or seat scanner 221). In an embodiment, the aisle scanner 222 performs a first type of detection (e.g., metal detection) and the wall scanner 223 performs a second type of detection (e.g., millimeter wave scan) different than the first type of detection. The mobile screening vehicle 210 detects when the passenger 202 is suitably positioned (e.g., via camera 218, or via detectors included in the wall scanner 223) and activates scanning by the wall scanner 223. In another embodiment, the mobile screening vehicle 210 continuously activates the wall scanner 223, or other scanners. In yet another embodiment, a given scanner will include detection capabilities to selectively energize the associated scanner when a passenger 202 is suitably proximate to that scanner.

After passing the wall scanner 223, the passenger 202 arrives at seat 212. Upon sitting, the mobile screening vehicle 210 detects that the passenger 202 is suitably arranged to activate the seat scanner 221. The seat scanner 221 can include a shoe scanner to scan the passenger's shoes. Similar to the features as described above, the seat scanner 221 can perform a different type of detection than the other scanners, and can also perform redundant types of detection. The mobile screening vehicle 210 can operate seat scanner 221 continuously, or selectively based on whether a passenger 202 is in position for scanning, and scanning is needed. In an embodiment, the mobile screening vehicle 210 selectively activates a subset of multiple scanners, based on how the different scanning technologies are deployed and what path the passenger 202 is taking on the way to seat 212. In an embodiment, the mobile screening vehicle 210 detects that the passenger 202 is standing for the trip, and activates the scanning technologies other than the seat scanner 221 in order to properly scan the passenger 202, even though the passenger 202 has chosen not to sit down.

The mobile screening vehicle 210 can use detection sensors such as camera 218 to monitor the passenger 202 and ensure that passenger behavior is compatible with scanning operations. If the passenger behavior is not compatible with obtaining a proper scan of the passenger 202, the mobile screening vehicle 210 can inform the passenger 202 to perform additional actions to complete scanning operations. If the passenger 202 still does not comply, the mobile screening vehicle 210 can refuse to proceed until receiving passenger compliance, or proceed to a secure area manned by TSOs, to assist the passenger in resolving the non-compliance issue.

Figure 3:
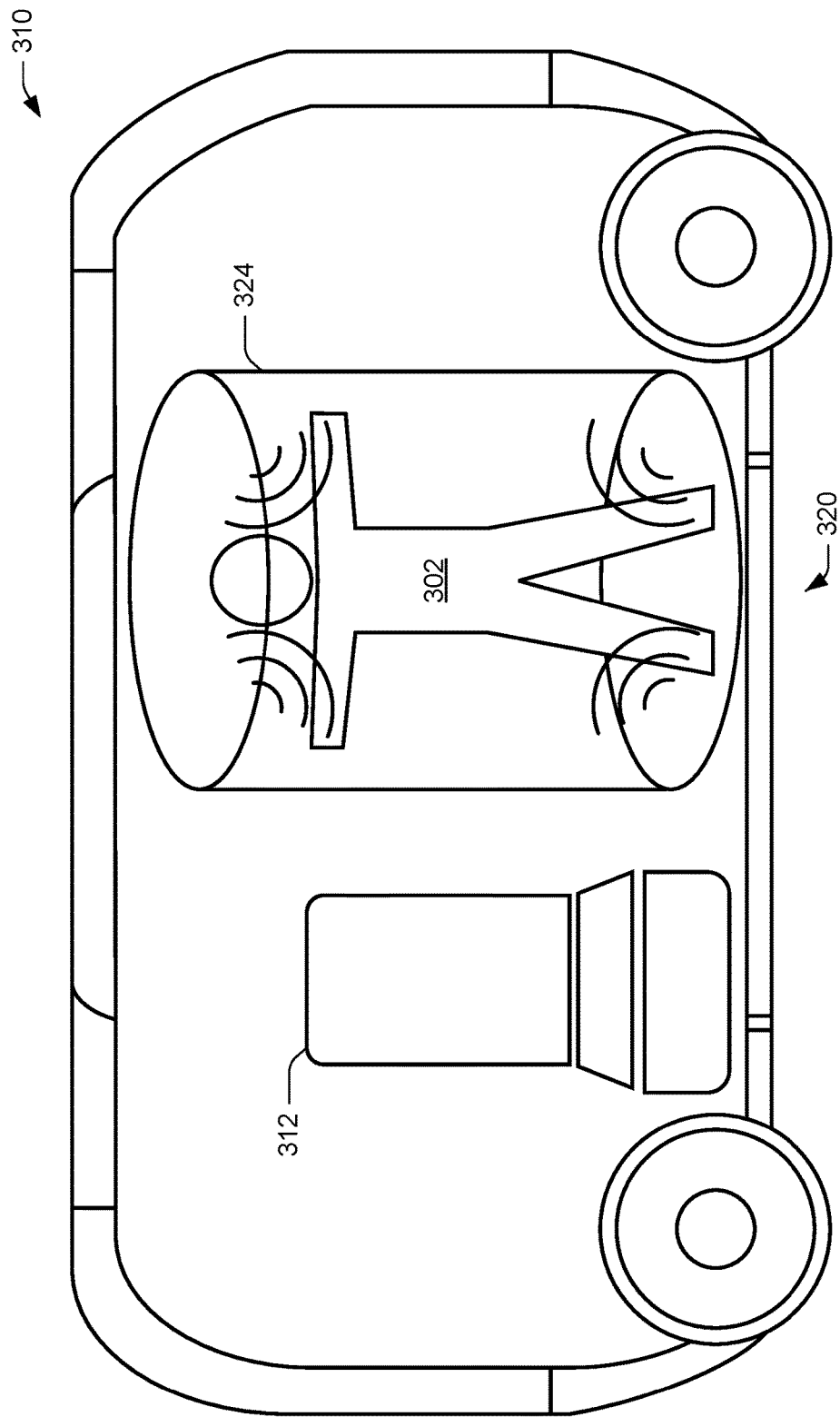
FIG. 3 illustrates a mobile screening vehicle including a passenger scanner according to an embodiment.

FIG. 3 illustrates a mobile screening vehicle 310 including a passenger scanner 320 according to an embodiment. The passenger scanner 320 is illustrated as a chamber scanner 324 in which a passenger 302 is standing and being scanned. After scanning, the passenger 302 exits the chamber scanner 324 and proceeds to sit down on seat 312.

Embodiments of the vehicle, such as buses, vans, trucks, and the like, are able to accommodate a full-size scanning chamber scanner 324 that passengers 302 stand inside while the chamber scanner 324 actuates to scan the passenger 302. In an embodiment, the chamber scanner 324 is set up in a path of the mobile screening vehicle 310, so that the passenger 302 undergoes scanning in the chamber scanner 324 on the way to the seat 312. In an embodiment, the chamber scanner 324 is a High-Definition (HD) AIT cylindrical body scanner with integrated mm-wave footwear scanner. The passenger scanner 320, such as chamber scanner 324, can incorporate controlled entry and exit portals, to control access depending on scan results. In an embodiment, the mobile screening vehicle 310 keeps an exit portal of the passenger scanner 320 closed until the scanning is completed, so that the passenger 302 cannot proceed past the passenger scanner 320 until the mobile screening vehicle 310 opens the exit portal of the passenger scanner 320.

FIG. 4 illustrates a mobile screening vehicle 410 including a passenger scanner 420 and a baggage scanner 430 according to an embodiment. The passenger scanner 420 is shown as a seat scanner 421 integrated into seat 412 in which the passenger 402 is sitting. The baggage scanner 430 includes a plurality of lockers 432 to receive baggage 403. The passenger scanner 420 is implemented in multiple seats 412. In an embodiment, the passenger scanner 420 is implemented in fewer than all seats 412. For example, the mobile screening vehicle 410 includes a non-scanning driver's seat, or a designated section with non-scanning seats (e.g., the mobile screening vehicle 410 uses other scanning technologies to scan the passenger).

The baggage scanner 430 is shown on the interior of the mobile screening vehicle 410. In other embodiments, the baggage scanner 430 can be on a roof or exterior of the mobile screening vehicle 410. Baggage 403 can be placed in the baggage scanner 430 located on an undercarriage, in a trunk, a special compartment, a cargo area, or the like of the mobile screening vehicle 410 to scan the baggage 403. The mobile screening vehicle 410 can identify baggage 403 (e.g., by scanning a bag tag) and match a specific piece of baggage 403 to a specific passenger 402.

The baggage scanner 430 can include one or more lockers 432. The mobile screening vehicle 410 can use the lockers to protect baggage 403 from release until positively verifying that the baggage 403 belongs to the passenger 402 who requested its release. In an embodiment, the mobile screening vehicle 410 uses a verification system (see verification system 140 of FIG. 1) to verify an identity of the passenger 402 when boarding and locking baggage 403 into a locker 432. The mobile screening vehicle 410 can similarly verify identify of baggage 403 by scanning a bag tag of the baggage 403. The mobile screening vehicle 410 associates the identity of that passenger 402 with the contents of the locker 432 selected when that passenger 402 loaded the locker 432. When disembarking, the passenger 402 verifies their identity with the mobile screening vehicle 410, which unlocks the corresponding locker 432 associated with that passenger 402. Such precautions enable the mobile screening vehicle 410 to prevent one passenger 402 from retrieving the baggage 403 of another passenger 402. In an embodiment, the mobile screening vehicle 410 can unlock the locker 432 for a given passenger's baggage 403 when stopping to drop off that passenger, who the mobile screening vehicle 410 has already identified, along with the correct baggage locker, by virtue of the mobile screening vehicle 410 already having verified the passenger and their baggage upon boarding, along with which stop at which the passenger will disembark.

In an embodiment, the mobile screening vehicle 410 can detect if baggage 403 is left on board after passengers 402 have disembarked. The mobile screening vehicle 410 can self-navigate to a designated baggage holding area of the travel venue, and carry such forgotten baggage 403 to the baggage holding area. As described above, embodiments of the mobile screening vehicle 410 can notify disembarking passengers 402 if their baggage or other items are being left behind, to avoid forgotten baggage 403 or other items. The mobile screening vehicle 410 can detect such situations based on verifying the identity of passenger 402 and whether a locker 432 continues to hold baggage 403 that the disembarking passenger 402 failed to retrieve. In another embodiment, the mobile screening vehicle 410 uses cameras or other detection equipment and artificial intelligence to identify baggage 403 or other items that are left behind in the mobile screening vehicle 410.

Figure 5:
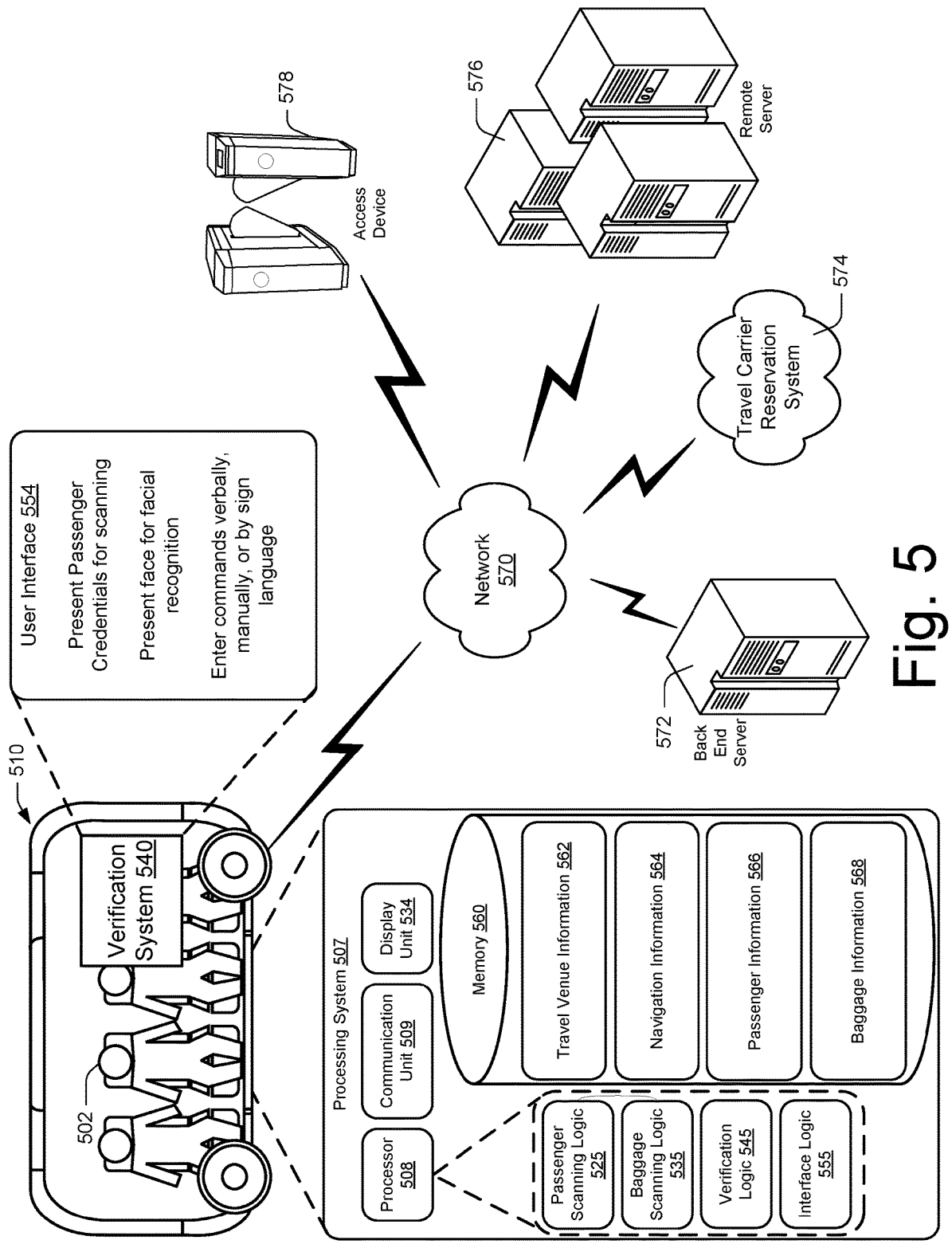
FIG. 5 illustrates a mobile screening vehicle communicating via a network according to an embodiment.

FIG. 5 illustrates a mobile screening vehicle 510 communicating via a network 570 according to an embodiment. The mobile screening vehicle 510 transports a plurality of passengers 502 throughout a travel venue. The mobile screening vehicle 510 includes a verification system 540 which presents a user interface 554 with which the passengers 502 can interact. The mobile screening vehicle 510 includes a processing system 507. The processing system 507 includes processor 508, communication unit 509, and display unit 534. The processor 508 includes passenger scanning logic 525, baggage scanning logic 535, verification logic 545, and interface logic 555. The mobile screening vehicle 510 also includes memory 560. The memory 560 includes travel venue information 562, navigation information 564, passenger information 566, and baggage information 568. The mobile screening vehicle 510 communicates via network 570 with back end server 572, travel carrier reservation system 574, remote server 576, and access device 578.

The passenger scanning logic 525 operates passenger scanners of the mobile screening vehicle 510 and enables the mobile screening vehicle 510 to scan passengers 502. The baggage scanning logic 535 operates baggage scanners and lockers of the mobile screening vehicle 510 and enables the mobile screening vehicle 510 to scan baggage. The verification logic 545 operates verification systems of the mobile screening vehicle 510 and enables the mobile screening vehicle 510 to verify passengers 502, baggage, flight information, and other information pertaining to passengers 502 or baggage. The interface logic 555 enables the mobile screening vehicle 510 to display information, interact with passengers 502, and display pertinent information for passengers to interact with or operate the mobile screening vehicle 510 and navigate throughout the travel venue.

In an embodiment, the mobile screening vehicle 510 communicates via network 570 with a remote server 576 to determine if the passenger's identity is on a "no fly" list or other list that indicates secondary screening is needed. If so, the mobile screening vehicle 510 transports the passenger to a secure location for assistance by TSOs or police.

Embodiments allow for customized operations by the mobile screening vehicle 510. The mobile screening vehicle 510 can be customized on a per-location basis corresponding to a given travel venue. For example, the mobile screening vehicle 510 can determine for a given airport how to efficiently operate outside and inside the airport, and which routes the mobile screening vehicle 510 is to navigate and which routes the mobile screening vehicle 510 should prefer. The interface logic 555 can use navigation information 564 to navigate routes, and the navigation information 564 can specify the constraints within which the mobile screening vehicle 510 is free to operate. For example, the mobile screening vehicle 510 can be programmed to allow for free-for-all movement within an allowed space, letting passengers 502 travel wherever they like within the space, so long as the mobile screening vehicle 510 does not cross over into a prohibited space (e.g., attempting to prematurely pass from the unsecure area to the secure area, i.e., without approval or completed scanning). Embodiments can allow for a similar free-for-all approach within an allowed region of the secure area of the travel venue, e.g., after passengers 502 and baggage have been scanned and approved to enter the secure area. The mobile screening vehicle 510 can be programmed with travel venue information 562 or navigation information 564 imposing additional constraints on freedom of movement, e.g., to streamline a given session of passenger transportation, or reduce the likelihood of delays caused by passenger exploration. In an example, an airport limits freedom of movement of the mobile screening vehicle 510 in view of the expected passenger demand and number of available mobile screening vehicles 510. In an embodiment, the mobile screening vehicle 510 disables passenger exploration and constrains navigation to specific travel paths (pre-arranged routes etc.) when passenger demand is high and the airport does not have enough vehicles to simultaneously satisfy the demand during that period of time.

The mobile screening vehicle 510 carries equipment for identification or verification of passengers 502 and baggage (e.g., via verification system 540), as well as equipment to scan or screen passengers and baggage (e.g., via passenger scanners or baggage scanners). Various different types of mobile screening vehicles 510 can be equipped to perform these functions, such as a relatively small bus or large sedan. Embodiments may use indoor vehicles, such as golf-cart sized electric vehicles used to assist passengers in airports. Embodiments may use outdoor vehicles, such as diesel-powered buses or electric vehicles used to transport crews from a staging area parking lot to a controlled exterior entrance into the airport. Such outdoor vehicles can process crew and provide security screening to eliminate a need for the airport crew to go through security lines internal to the airport that are used by passengers. Embodiments enable scanning at speed, and serve as another precaution against insider threats. Embodiments can be used in applications and travel venues beyond the airport terminal, and extend to other potential locations and applications such as train stations, ferry terminals or ship terminals, bus stations, and the like.

Embodiments enable the mobile screening vehicle 510 to operate as a secure vehicle, by verifying people (crew, employees, passengers, etc.) who present access credentials to the verification system 540 of the mobile screening vehicle 510 for scanning or screening. The mobile screening vehicle 510 may then proceed autonomously to carry the passengers 502 directly to a secure area. In other embodiments, the mobile screening vehicle 510 includes a driver that manually drives the mobile screening vehicle 510, while the mobile screening vehicle 510 automatically accomplishes one or more of the goals including identifying or verifying people or baggage, scanning or screening people or baggage, and ensuring that the mobile screening vehicle 510 remains secure (people and baggage). The mobile screening vehicle 510 accommodates people with disabilities, including mental or physical disabilities (e.g., autism, wheelchair, etc.).

The mobile screening vehicle 510 can store and retrieve information using memory 560, which is useful before, during, and after transport of passengers 502. The mobile screening vehicle 510 uses travel venue information 562 for customizing aspects and performance of the mobile screening vehicle 510 as tailored to a given travel venue. The navigation information 564 enables the mobile screening vehicle 510 to efficiently navigate outside or inside a travel venue. In an embodiment, the mobile screening vehicle 510 uses the navigation information 564 to keep track of past navigation performance of various routes, to track route efficiencies at different times of the day and different conditions at the travel venue, for selecting an optimal route for given conditions at the travel venue. The mobile screening vehicle 510 uses passenger information 566 to verify identity of passengers 502 and to keep track of the credentials presented by passengers 502, facial recognition information, or other information associated with the passengers 502. The mobile screening vehicle 510 uses baggage information 568 to track baggage that is loaded onto the mobile screening vehicle 510, including the tag information as scanned and recorded by the baggage scanner or verification system 540 of the mobile screening vehicle 510.

In an example scenario according to an embodiment, the mobile screening vehicle 510 interacts with passengers 502 in the following manner. Passengers 502 input a request through a travel carrier reservation system 574, such as an online website of an airline. The travel carrier reservation system 574 communicates the request to the mobile screening vehicle 510, and the mobile screening vehicle 510 verifies its availability and scheduling, and sends an autonomous vehicle ID number back to the travel carrier reservation system 574. Passengers 502 receive the autonomous vehicle ID number from the travel carrier reservation system 574 at the airline check-in. Passengers 502 meet the autonomous mobile screening vehicle 510 after airline check-in in an unsecure area of the travel venue. Passengers 502 verify their identity through verification system 540 in order to board the autonomous mobile screening vehicle 510. If the mobile screening vehicle 510 cannot verify the passenger's identity, the autonomous mobile screening vehicle 510 will not allow boarding.

Passengers 502 place carry-on baggage in a designated area of the mobile screening vehicle 510 for scanning, such as a locker of a baggage scanner. Autonomous vehicle sensors verify the passengers 502 are seated and ready to begin travel. The mobile screening vehicle 510 informs passengers 502 it will begin its route. The mobile screening vehicle 510 informs passengers 502 they are to remain on board until the mobile screening vehicle 510 reaches a drop off location corresponding to their gate. The mobile screening vehicle 510 navigates to the drop off location based on entered passenger data, such as flight information which the mobile screening vehicle 510 correlates and stores as passenger information 566.

The passenger screening equipment is built into the autonomous mobile screening vehicle 510, such as the seat scanners described above. Passenger screening begins when the mobile screening vehicle 510 begins moving. The mobile screening vehicle 510 sends screening data (collected information, which can be stored as part of the passenger information 566 or baggage information 568) to the back end server 572 for analysis and verification. The back end server 572 can perform automated analysis, or can present the screening data to a TSO or other human reviewer for screening analysis. The mobile screening vehicle 510 can communicate over network 570 via Wi-Fi communication, cellular communication, radio communication, or other networking protocols.

Baggage screening equipment is built into the mobile screening vehicle 510. Baggage screening begins once autonomous vehicle begins moving. The mobile screening vehicle 510 sends baggage screening data (which can be part of stored baggage information 568) via network 570 to the back end server 572 for analysis and verification, whether automated or performed by a human reviewer for screening analysis.

If screening is successful for passengers and baggage, the mobile screening vehicle 510 crosses a "point of no return" from an unsecure area into a sterile (e.g., secure) area, i.e., transitions from the unsecure area to the secure area. If screening results in an abnormality, the mobile screening vehicle 510 auto redirects to a back end location for secondary screening, such as a secondary screening station manned by TSOs or other human reviewers. Upon clearing of the screening abnormality, the mobile screening vehicle 510 continues along its route as requested by the passenger 502.

Upon reaching the route destination (drop off location) for a given passenger 502, the autonomous vehicle informs the passenger 502 that it is time to exit the mobile screening vehicle 510. The mobile screening vehicle 510 repeats additional drop offs for additional passengers 502. After dropping off the last passenger 502, sensors in the mobile screening vehicle 510 verify that passengers have disembarked before departing from the final drop off location. The Autonomous vehicle returns to its back end designated parking spot for charging, cleaning, reassignment, or a next scheduled activity.

The autonomous mobile screening vehicle 510 contains various software or logic and storage or information to perform passenger scanning, baggage scanning, or navigation. For example, the mobile screening vehicle 510 includes: software or hardware (e.g., navigation information 564) to store an identification (ID) number unique to the mobile screening vehicle 510; software or hardware to transmit autonomous vehicle data between airports and travel carrier reservation system 574; software or hardware (e.g., verification system 540) to process credentials and forms for identity verification including but not limited to biometrics, paper or electronic boarding passes, physical or electronic Government issued IDs, facial image matching to ID, etc. The mobile screening vehicle 510 also includes software or hardware to verify number of passengers per trip; software or hardware capable of verifying assigned passengers; software or hardware (e.g., navigation system 650) to set routes within or outside of the travel venue or designated usage area; software or hardware to provide passengers the ability to select from preprogrammed routes; software or hardware that directs the autonomous mobile screening vehicle 510 to return to the unsecure side of the travel venue once passengers have disembarked; software or hardware that prevents the autonomous mobile screening vehicle 510 from returning to the secure area once it crosses the point of no return when empty or if transporting arriving passengers to the unsecure area. The mobile screening vehicle can include software or hardware such as cameras inside the mobile screening vehicle 510 to verify passenger identity and for passenger security or safety; software or hardware such as cameras, LIDAR, and the like outside the vehicle to monitor for obstacles, to ensure safety for riders, and to maintain a safe distance from objects, both stationary and moving. The mobile screening vehicle 510 can include software or hardware to redirect the autonomous mobile screening vehicle 510 to a back end area for secondary screening; software or hardware to direct the mobile screening vehicle 510 to continue to a gate once secondary screening has been resolved; software or hardware to recognize that passengers have disembarked from the autonomous mobile screening vehicle 510 after arriving at a destination (e.g., drop off location) based on a time the mobile screening vehicle 510 is empty; software or hardware to reassign the autonomous mobile screening vehicle 510 from a back end command center to pick up arriving disabled passengers. The mobile screening vehicle 510 also can include a UV sanitization system to run when the mobile screening vehicle 510 is empty and between passenger groups; software or hardware for baggage screening and scanning including equipment that meets or exceeds TSA security screening requirements; software or hardware for human screening and scanning including equipment that meets or exceeds TSA security screening requirements. The mobile screening vehicle 510 can include screening or scanning equipment that is visually unobtrusive to passengers; software or hardware to generate and provide an information panel that includes but is not limited to using large print and icons, implements voice interaction, and smartphone app integration. The mobile screening vehicle 510 also can include software or hardware for an information panel including an emergency activation that, when activated, stops the mobile screening vehicle 510 and sends information or a request to the back end command center to send assistance to the present location of the mobile screening vehicle 510. The mobile screening vehicle 510 can include software or hardware to interface with a secure wireless communication network 570 between the mobile screening vehicle 510 and a back end server 572 or command center, or to control an access device 578. The mobile screening vehicle 510 can include software or hardware to implement a separate secure wireless communication network, to transmit screening or scanning data to a back end security operations center such as remote server 576 or back end server 572. The mobile screening vehicle 510 can include software or hardware to implement full self-navigation, such as self-driving level 5 (FSD5).

Figure 6:
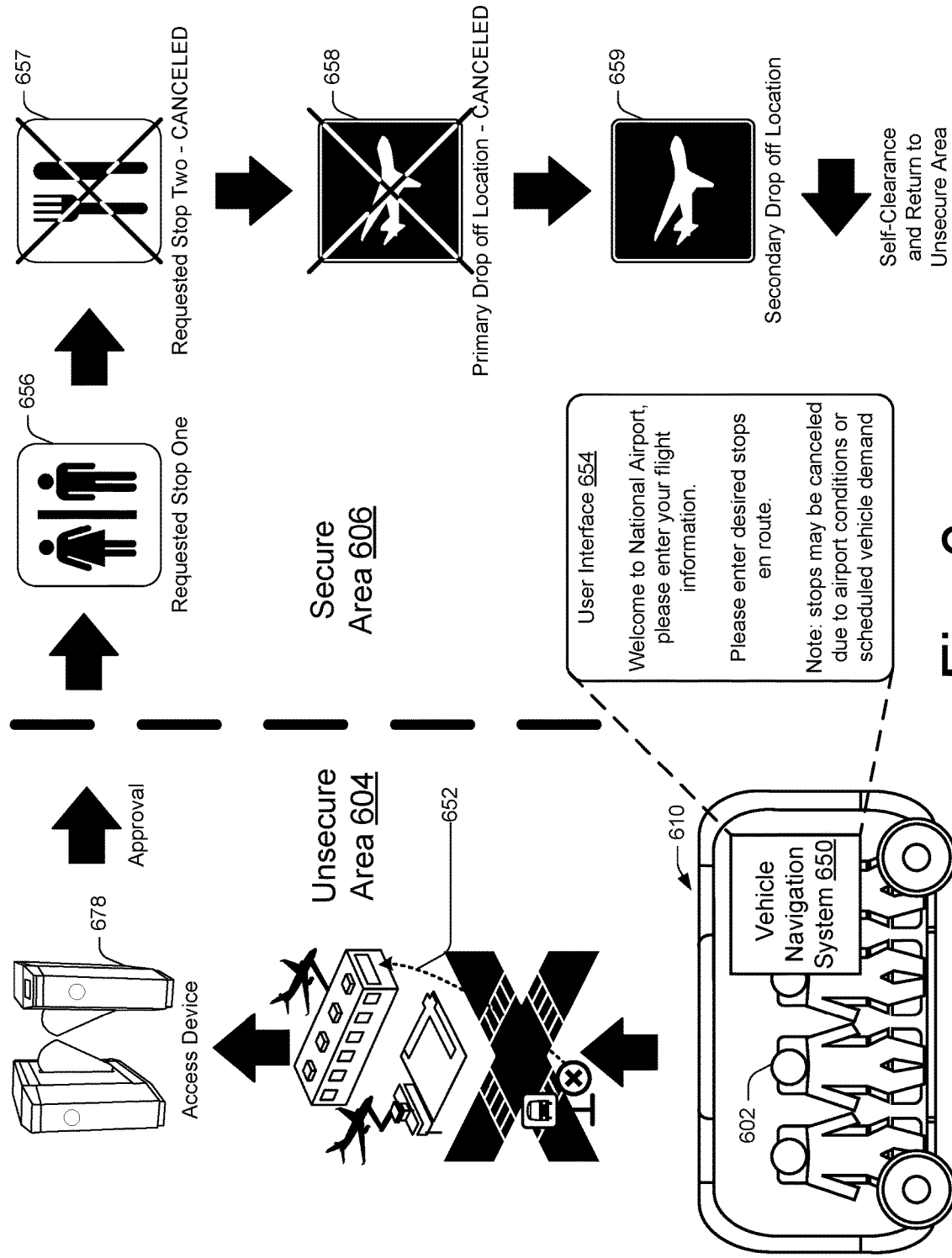
FIG. 6 illustrates a mobile screening vehicle navigating an unsecure area and a secure area of a travel venue according to an embodiment.

FIG. 6 illustrates a mobile screening vehicle 610 navigating an unsecure area 604 and a secure area 606 of a travel venue according to an embodiment. The mobile screening vehicle 610 can navigate outdoors or indoors, and can be used by employers, workers, passengers, and the like. The mobile screening vehicle 610 includes a vehicle navigation system 650 which has a user interface 654. The vehicle navigation system 650 guides the mobile screening vehicle 610 along a route 652 from a bus stop into a travel venue. The travel venue includes unsecure area 604, such as the outdoors and a portion of an indoor area within the travel venue. The mobile screening vehicle 610 obtains approval from a central server or other security process, such as review of scanning results by human TSOs. In an embodiment, upon approval, the mobile screening vehicle 610 instructs access device 678 to open, to allow the mobile screening vehicle 610 to proceed. The mobile screening vehicle 610 requests and obtains approval, e.g., by transmitting passenger scanning information or baggage scanning information for remote analysis. Upon receiving approval the mobile screening vehicle 610 then proceeds from the unsecure area 604 to the secure area 606 of the travel venue. The vehicle navigation system 650 allows passengers 602 to request stops, such as stops within the secure area 606. Requested stop one 656 is shown as a restroom, and requested stop two 657 is shown as a restaurant. After processing the requested stops, the mobile screening vehicle 610 proceeds to drop off passengers 602 at the drop off locations. The drop off locations include primary drop off location 658 and secondary drop off location 659. In embodiments, additional requested stops and drop off locations are used, pertaining to the passenger load and selections. While navigating, the vehicle navigation system 650 of the mobile screening vehicle 610 determines that requested stop two 657 and primary drop off location 658 are canceled. Accordingly, the mobile screening vehicle 610 proceeds from requested stop one 656 to secondary drop off location 659. The mobile screening vehicle 610 drops off the passengers 602 at the secondary drop off location 659. The mobile screening vehicle 610 performs a self-clearance to ensure that no passengers or baggage remain on board, and the mobile screening vehicle 610 returns to the unsecure area 604.

The mobile screening vehicle 610 can include multiple cameras, LiDAR sensors, and radars. Such equipment enables the mobile screening vehicle 610 to capture a 360-degree view of the mobile screening vehicle 610 and surroundings, useful for manned navigation or unmanned autonomous navigation. In addition, obstacle avoidance technology ensures that the mobile screening vehicle 610 steers clear of collisions and has the ability to re-route should a path become obstructed.

Passengers 602 do not need to know their gate or gate location. The passenger 602 can confirm the mobile screening vehicle 610 has their flight information (e.g., as provided by the passenger 602, as determined from passenger documents when the mobile screening vehicle 610 identifies the passenger 602, as retrieved from a server that the mobile screening vehicle 610 queries in response to identifying the passenger 602, and so on). The passenger 602 can manually say or otherwise input their flight information to the mobile screening vehicle 610. The mobile screening vehicle 610 identifies a suitable route, such as the most direct route, to carry the passenger 602 to a location appropriate for that flight, such as an airline gate or location suitable for the gate corresponding to the passenger's flight information. The mobile screening vehicle 610 can choose a drop off location near the gate, or a drop off location elsewhere (e.g., a secondary drop off location based on conditions).

Embodiments of the mobile screening vehicle 610 can be used as part of an airport worker or employee process, to streamline how airport workers or employees arrive to work. The mobile screening vehicle 610 can transport airline staff and airport workers from their designated parking areas to the terminal. The mobile screening vehicle 610 scans airline and airport personnel in transit from parking areas to the terminal, to ensure the safety of everyone using air travel. Generally, the workers board the autonomous mobile screening vehicle 610 at a designated parking lot or bus stop point. The workers place their backpacks, lunch bags, or the like in a designated baggage scanner area of the mobile screening vehicle 610, such as a locker of the baggage scanner. The workers interact with user interface 654 of the mobile screening vehicle 610 to submit their airport entry point information, which can be an entry location (similar to an airport gate, but for employees or workers instead of everyone).

The mobile screening vehicle 610 verifies that passengers 602 are boarded and sitting in the mobile screening vehicle 610 before moving. In an embodiment, the mobile screening vehicle 610 allows passengers 602 to stand and hold a handrail or other handle before moving. The mobile screening vehicle 610 navigates to the airport designated entry point, while conducting scans of passengers 602 and baggage during the drive. The mobile screening vehicle 610 does not stop between pickup and drop-off points. The mobile screening vehicle 610 communicates by network with a back end server, to provide camera information or scanning information from passengers 602 and baggage, and to obtain approval or disapproval of the scanning results.

Scanning performed by the mobile screening vehicle 610 is monitored from a secure location by transportation security officers (TSOs). Upon receiving approval of successful scan results, the mobile screening vehicle 610 drops off the passengers at their designated airport entry points. Upon receiving disapproval due to unsuccessful scan results, the mobile screening vehicle 610 reroutes itself to a location for TSO in-person assistance (e.g., secondary screening) to clear the issue. Once cleared, the mobile screening vehicle 610 continues to the designated airport entry points. Once passengers 602 exit the mobile screening vehicle 610, the mobile screening vehicle 610 returns itself to its designated parking spot for cleaning, reassignment, parking, recharging, and the like.

Similar to the airport worker or employee process, the mobile screening vehicle 610 can transport travel venue passengers 602 or other people or items (including travelers with disabilities) as part of a passenger process, e.g., serving as passenger transport from airport check-in locations to airline gates. Passengers 602 board the mobile screening vehicle 610 after checking in with the airline. The passengers 602 place their baggage in a designated baggage area of the mobile screening vehicle 610, such as the locker of a baggage scanner. Passengers enter their flight information into the vehicle navigation system 650 via the user interface 654, or the mobile screening vehicle 610 automatically determines the flight information as described above. The mobile screening vehicle 610 determines relevant drop off locations corresponding to the flight information of the passengers 602. The mobile screening vehicle 610 verifies that passengers 602 are boarded and sitting before moving. The mobile screening vehicle 610 navigates to the gate or drop off locations, and conducts scans of people or baggage while driving. TSOs monitor and evaluate the scanning results from a secure location, and decide to approve or disapprove the results. Upon approval of a successful scan, the mobile screening vehicle 610 passes a point of no return, e.g., a transition from unsecure area 604 to secure area 606.

A travel venue may protect transitions between unsecure areas 604 and secure areas 606 by using an access device 678. The mobile screening vehicle 610 can communicate with the access device 678 and provide authorization to pass. The mobile screening vehicle 610 can obtain the authorization to pass through the access device 678 from the TSOs as part of the approval of screening results, and transmit the authorization to the access device 678. Passengers 602 can now redirect the mobile screening vehicle 610 to make additional stops, e.g., at restrooms such as at requested stop one 656, at restaurants such as at requested stop two 657, or the like.

If the TSOs provide a disapproval, e.g., as a result of an unsuccessful screening scan, the mobile screening vehicle 610 is rerouted to a location for TSO in-person assistance to clear the issue. Once cleared, the vehicle continues to the passenger's gate or other drop off locations. The mobile screening vehicle 610 allows for passengers 602 to request other stops within the secure area 606, via the user interface 654 which can provide a dashboard or app that interacts with passengers and can recognize voice control inputs or sign language inputs. Upon reaching the drop off locations, passengers 602 exit the mobile screening vehicle 610 and release it. In an embodiment, if the passengers 602 do not release the mobile screening vehicle 610, it remains at the gate until the aircraft doors have closed. The mobile screening vehicle 610 then returns to its designated parking spot for cleaning and reassignment.

The passenger 602 can request stops for restrooms, food, and the like. The mobile screening vehicle 610 determines appropriate options along the path to the destination(s), or can determine detours or otherwise accommodate such stops whether en route to the destination or beyond the destination (and return to the destination after the stops). In an embodiment, once the mobile screening vehicle 610 transitions from the unsecure area 604 into the secure area 606, the mobile screening vehicle 610 does not go back into the unsecure area until the mobile screening vehicle 610 is cleared to return (e.g., after dropping off the passengers at stops or the destinations, who were cleared for the secure area 606). In another embodiment, if the mobile screening vehicle 610 passes back into the unsecure area 604 (e.g., for a detour), the mobile screening vehicle 610 knows to re-scan passengers 602 and baggage before passing into the secure area 606.

The vehicle navigation system 650 intelligently determines whether additional stops or drop offs are to be canceled. For example, the mobile screening vehicle 610 communicates with a back end server to determine conditions at the travel venue. If a section of the airport is temporarily closed (e.g., a restroom or restaurant is closed for cleaning), the mobile screening vehicle 610 can cancel that requested stop. In another embodiment, the mobile screening vehicle 610 determines that the travel venue is particularly crowded, and cancels a stop associated with travel in a section of the travel venue that is heavily crowded and therefore inefficient to navigate through.

In an embodiment, the mobile screening vehicle 610 communicates with a back end server to determine that there is high demand (e.g., many outstanding passenger requests) for services of the mobile screening vehicle 610. Accordingly, the mobile screening vehicle 610 can use the vehicle navigation system 650 to cancel some stops or drop off locations, e.g., by skipping non-restroom stops and by using alternate drop off locations or secondary drop off locations that are faster for the mobile screening vehicle 610 to service. Accordingly, the mobile screening vehicle 610 achieves faster completion times for existing routes, allowing the mobile screening vehicle 610 to return sooner to pick up new passengers 602.

Figure 7:
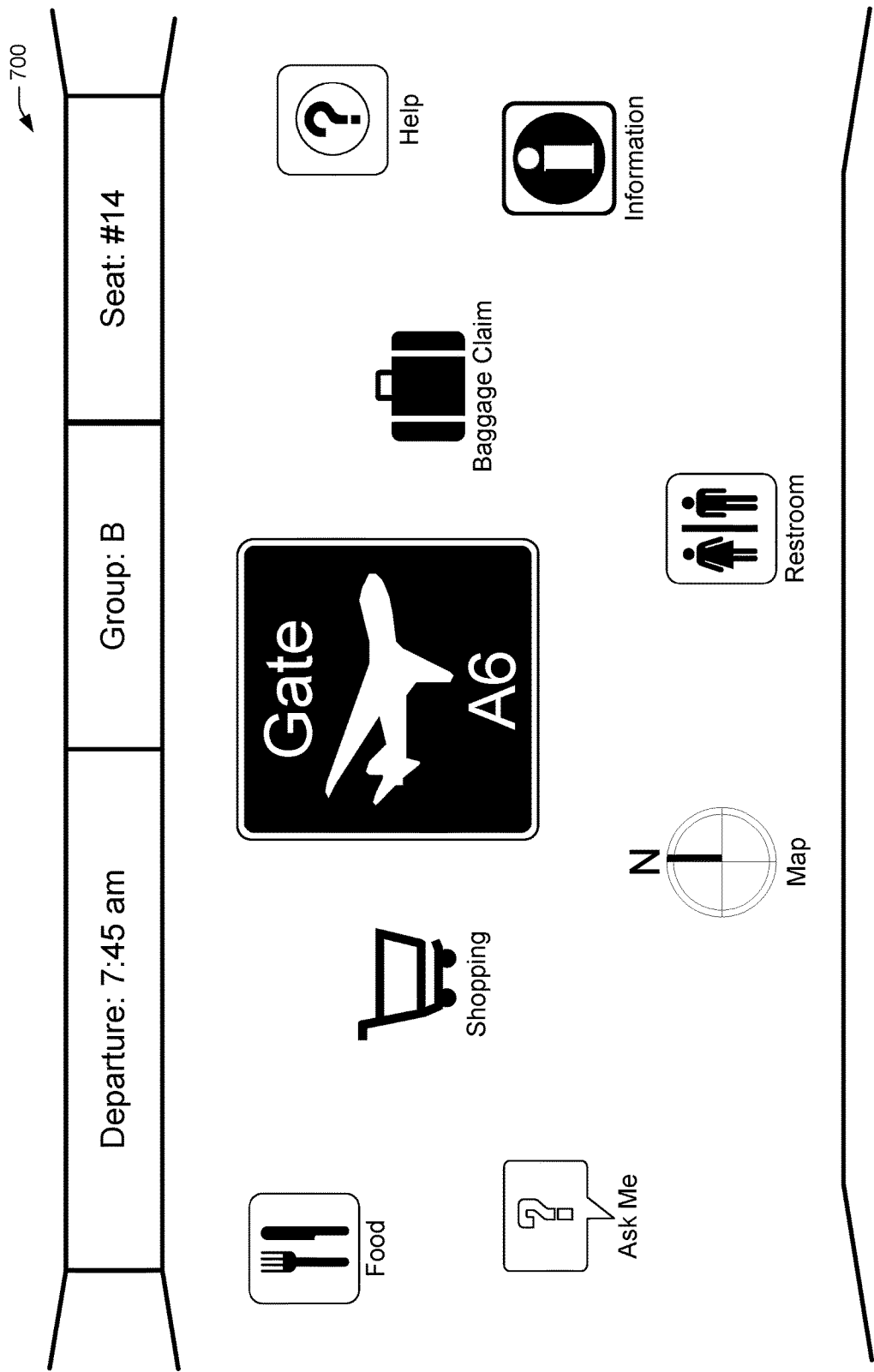
FIG. 7 illustrates a mobile screening vehicle user interface according to an embodiment.

FIG. 7 illustrates a mobile screening vehicle user interface 700 according to an embodiment. The user interface 700 includes an information section for a given passenger, displaying the departure time, boarding group, seat number at a top of the user interface 700. The gate information is centrally displayed. The user interface 700 also includes selectable icons for user interactions, such as food, shopping, ask me, map, restroom, information, baggage claim, and help.

The user interface 700 can be provided on a display in the mobile screening vehicle. In an embodiment, the user interface 700 is displayed on a smartphone app on a passenger's smartphone. The user interface 700 can include front end interfaces and back end interfaces. In an embodiment, the interfaces are represented by a Modally™ mobile app, which manages and optimizes vehicle operations and dynamic routing, while providing an end-to-end, seamless experience for passengers.

Figure 8:
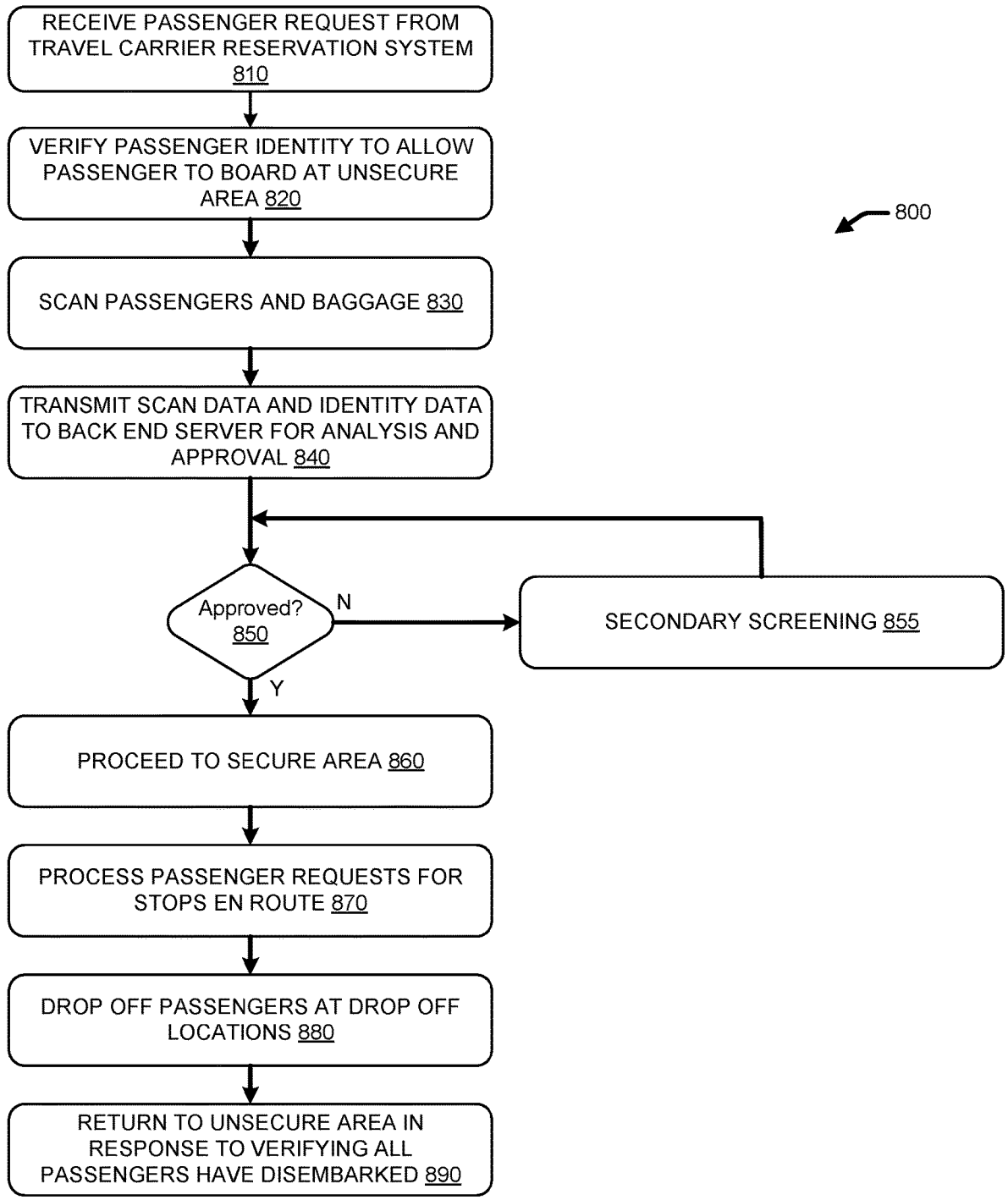
FIG. 8 illustrates a method of scanning and transporting passengers according to an embodiment.

FIG. 8 illustrates a method 800 of scanning and transporting passengers according to an embodiment. At receiving 810, the mobile screening vehicle receives passenger requests from a travel carrier reservation system. For example, passengers book a flight at the travel carrier system and request pickup by the mobile screening vehicle. The travel carrier system generates information for the passenger to verify their identity with the mobile screening vehicle upon pickup, and sends matching verification information to the mobile screening vehicle to allow the mobile screening vehicle to confirm verification. At verification 820, the mobile screening vehicle verifies passenger identity to allow passengers to board at the unsecure area. For example, the travel venue has a designated pick up location for the mobile screening vehicle, such as a bus stop or location in the travel venue. The mobile screening vehicle requests passenger identity documents or credentials, scans them, and compares them to information from the travel carrier system for passengers scheduled to be picked up. At scanning 830, the mobile screening vehicle scans passengers and baggage as part of security screening procedures. For example, the mobile screening vehicle includes a seat scanner integrated into a seat of the mobile screening vehicle, which automatically activates to scan the passenger when the passenger is seated. The mobile screening vehicle also includes a baggage scanner, such as one or more lockers in which the mobile screening vehicle can secure baggage. In another embodiment, the baggage scanner is an open area and does not include lockers, but includes baggage scanning technology to scan any baggage places in the open area designated to receive baggage.

At transmission 840, the mobile screening vehicle transmits scan data and identity data to a back end server for analysis and approval. For example, the mobile screening vehicle collects scan data on board, and sends the scan data to a remote server. The remote server passes the scan data to terminals manned by human TSOs who review the scan data and evaluate whether to approve or disapprove based on the review. At decision 850, the mobile screening vehicle determines whether approval is received. If approval is not received flow proceeds to secondary screening 855, where the mobile screening vehicle waits for its contents to be checked at secondary screening. The mobile screening vehicle then checks for approval again at decision 850. If approval is received, the mobile screening vehicle advances to the proceeding to the secure area 860.

At process 870, the mobile screening vehicle processes passenger requests for stops en route to the drop off locations. For example, the passengers submit requests for the mobile screening vehicle to stop at restrooms, restaurants, shopping, and so on. The mobile screening vehicle evaluates the route and the stops, as well as other factors such as demand for the mobile screening vehicle and conditions at the travel venue, and decides whether to accept the requests for stops. In an embodiment, the mobile screening vehicle passes the requests to a back end server for human evaluation whether to accept the requested stops. At drop off 880, the mobile screening vehicle drops off passengers at drop off locations. For example, the mobile screening vehicle determines that conditions are suitable for dropping off each passenger at the specific gate corresponding to that passenger's flight. At return 890, the mobile screening vehicle returns to the unsecure area in response to verifying that passengers and baggage have disembarked. For example, the mobile screening vehicle uses sensors and software to scan the interior of the mobile screening vehicle and check for passengers or items. Once the passengers are disembarked off board, the mobile screening vehicle closes its automatic doors and the mobile screening vehicle returns the unsecure area at a docking station for charging, cleaning, sanitization, charging and so on, awaiting its next assignment.

While a number of embodiments of the present subject matter have been described, it should be appreciated that the present subject matter provides many applicable inventive concepts that can be embodied in a wide variety of ways. The embodiments discussed herein are merely illustrative of ways to make and use the subject matter and are not intended to limit the scope of the claimed subject matter. Rather, as will be appreciated by one of skill in the art, the teachings and disclosures herein can be combined or rearranged with other portions of this disclosure and the knowledge of one of ordinary skill in the art.

Terms and phrases used in this document, unless otherwise expressly stated, should be construed as open ended as opposed to closed—e.g., the term "including" should be read as meaning "including, without limitation" or the like; the term "example" is used to provide example instances of the item in discussion, not an exhaustive or limiting list thereof; the terms "a" or should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Furthermore, the presence of broadening words and phrases such as "one or more," "at least," "but not limited to," or other similar phrases, should not be read to mean that the narrower case is intended or required in instances where such broadening phrases may be absent. Any headers used are for convenience and should not be taken as limiting or restricting. Additionally, where this document refers to technologies that would be apparent or known to one of ordinary skill in the art, such technologies encompass those apparent or known to the skilled artisan now or at any time in the future.

What is claimed is:

1. A mobile screening vehicle comprising:
   a passenger scanner that performs security scanning of a passenger on the mobile screening vehicle;
   a verification system that verifies, consistent with the security scanning of passengers, that passengers on the mobile screening vehicle are approved to proceed to a secure area of a travel venue; and
   a baggage scanner that performs security scanning of baggage on the mobile screening vehicle;
   the verification system associating a piece of baggage with the passenger and verifying, consistent with the security scanning of the baggage, that the baggage on the mobile screening vehicle is approved to proceed to the secure area of the travel venue; and
   the baggage scanner including lockers integrated into the mobile screening vehicle to secure baggage, the verification system associating a locker with the passenger and locking and unlocking the locker based on verifying the passenger.

2. The mobile screening vehicle of claim 1, wherein the passenger scanner is integrated into a passenger seat and scans the passenger while the passenger is seated.

3. The mobile screening vehicle of claim 1, wherein the passenger scanner is integrated into an aisle of the mobile screening vehicle and scans the passenger when the passenger traverses the aisle.

4. The mobile screening vehicle of claim 1, wherein the passenger scanner is integrated into a wall of the mobile screening vehicle and scans the passenger when the passenger is within scanning proximity of the wall of the mobile screening vehicle.

5. The mobile screening vehicle of claim 1, wherein the passenger scanner is a chamber in the mobile screening vehicle that scans the passenger when the passenger stands in the chamber.

6. The mobile screening vehicle of claim 1, further comprising a vehicle navigation system to autonomously determine a route through the travel venue based on passenger travel information, and autonomously traverse the route and drop off the passenger at a drop off location of the travel venue corresponding to the passenger travel information.

7. The mobile screening vehicle of claim 6, wherein the vehicle navigation system accepts a passenger request to make a stop along the route, and automatically cancels the passenger request to make the stop based on scheduled passenger demand for the mobile screening vehicle and conditions at the travel venue.

8. The mobile screening vehicle of claim 6, wherein the vehicle navigation system prevents the mobile screening vehicle from entering or leaving the secure area of the travel venue until receiving approval.

9. The mobile screening vehicle of claim 6, wherein the vehicle navigation system adjusts the drop off location based on scheduled demand for the mobile screening vehicle and conditions at the travel venue.

10. The mobile screening vehicle of claim 1, wherein the verification system verifies passenger identity by scanning credentials of the passenger.

11. The mobile screening vehicle of claim 1, wherein the verification system verifies passenger identity by performing a liveness check of the passenger.

12. The mobile screening vehicle of claim 1, wherein the verification system verifies passenger identity by retrieving, from a back end server, travel information of passengers scheduled to board the mobile screening vehicle, and comparing the travel information against credentials presented by the passenger boarding the mobile screening vehicle.

13. The mobile screening vehicle of claim 1, wherein the verification system transmits scan data and identity data to a back end server for analysis and approval.

14. A method for mobile security scanning by a mobile screening vehicle, comprising:
   performing, by a passenger scanner of the mobile screening vehicle, security scanning of a passenger on the mobile screening vehicle;
   verifying, by a verification system of the mobile screening vehicle, that passengers on the mobile screening vehicle are approved, consistent with the security scanning of passengers, to proceed to a secure area of a travel venue;
   transporting, by the mobile screening vehicle, the passenger to a drop off location in the secure area of the travel venue;
   performing, by a baggage scanner of the mobile screening vehicle, security scanning of baggage on the mobile screening vehicle;
   associating, by the verification system, a piece of baggage with the passenger; and verifying, by the verification system, that baggage on the mobile screening vehicle is approved, consistent with the security scanning of the baggage, to proceed to the secure area of the travel venue;

the baggage scanner including lockers integrated into the mobile screening vehicle to secure baggage, the method further comprising:

associating, by the verification system, a locker with the passenger;

locking the locker based on verifying the passenger; and unlocking the locker based on verifying the passenger.

15. The method of claim 14, further comprising scanning the passenger, by the passenger scanner integrated into a passenger seat, while the passenger is seated.

16. The method of claim 14, further comprising scanning the passenger, by the passenger scanner integrated into an aisle of the mobile screening vehicle, when the passenger traverses the aisle.

17. The method of claim 14, further comprising scanning the passenger, by the passenger scanner integrated into a wall of the mobile screening vehicle, when the passenger is within scanning proximity of the wall of the mobile screening vehicle.

18. The method of claim 14, further comprising scanning the passenger, by the passenger scanner being a chamber in the mobile screening vehicle, when the passenger stands in the chamber.

19. The method of claim 14, wherein the mobile screening vehicle includes a vehicle navigation system, the method further comprising:

autonomously determining, by the vehicle navigation system, a route through the travel venue based on passenger travel information;

autonomously traversing the route; and dropping off the passenger at the drop off location of the travel venue corresponding to the passenger travel information.

20. The method of claim 19, further comprising accepting, by the vehicle navigation system, a passenger request to make a stop along the route.

21. The method of claim 20, further comprising automatically canceling the passenger request to make the stop based on scheduled passenger demand for the mobile screening vehicle and conditions at the travel venue.

22. The method of claim 19, further comprising preventing, by the vehicle navigation system, the mobile screening vehicle from entering or leaving the secure area of the travel venue until receiving approval.

23. The method of claim 19, further comprising adjusting, by the vehicle navigation system, the drop off location based on scheduled demand for the mobile screening vehicle and conditions at the travel venue.

24. The method of claim 14, further comprising scanning, by the verification system, credentials of the passenger to verify passenger identity.

25. The method of claim 14, further comprising performing, by the verification system, a liveness check of the passenger to verify passenger identity.

26. The method of claim 14, further comprising:

retrieving, by the verification system, travel information from a back end server for passengers scheduled to board the mobile screening vehicle;

comparing the travel information against credentials presented by the passenger boarding the mobile screening vehicle to verify passenger identity; and transmitting scan data and identity data to a back end server for analysis and approval.

\* \* \* \* \*